United States Patent
Maher et al.

(10) Patent No.: US 6,647,020 B1
(45) Date of Patent: Nov. 11, 2003

(54) METHODS FOR IMPLEMENTING A TALKGROUP CALL IN A MULTICAST IP NETWORK

(75) Inventors: John W. Maher, Woodstock, IL (US); Daniel J. McDonald, Cary, IL (US); Robert Biggs, Algonquin, IL (US); Mario DeRango, Wauconda, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/464,269

(22) Filed: Dec. 17, 1999

(51) Int. Cl.[7] ................................................. H04J 3/26
(52) U.S. Cl. ......................... 370/432; 370/390; 455/518
(58) Field of Search ................................ 370/260, 261, 370/262, 270, 277, 278, 279, 293, 312, 313, 327, 328, 349, 390, 432; 455/416, 500, 516, 517, 518, 519

(56) References Cited

U.S. PATENT DOCUMENTS

| | | | |
|---|---|---|---|
| 5,761,193 A | | 6/1998 | Derango et al. ............. 370/312 |
| 5,835,723 A | * | 11/1998 | Andrews et al. ............. 709/226 |
| 5,910,946 A | | 6/1999 | Csapo ......................... 370/328 |
| 6,134,587 A | * | 10/2000 | Okanoue ...................... 709/222 |
| 6,477,149 B1 | * | 11/2002 | Okanoue ...................... 370/312 |

* cited by examiner

Primary Examiner—Douglas Olms
Assistant Examiner—Bob A. Phunkulh
(74) Attorney, Agent, or Firm—Steven R. Santema; Terri S. Hughes

(57) ABSTRACT

Systems and methods for implementing dispatch calls using IP multicasting protocols are disclosed. The methods include utilizing a payload multicast group address for distributing payload, and utilizing a control multicast group address for distributing control messages to members of the talkgroup in a single-zone (FIG. 1). A zone controller 116 dynamically identifies payload and control multicast group addresses and sends them to participating sites 102, 104. The participating sites 102, 104 issue Join commands to associated network devices 108, 110 to receive payload and control messages addressed to the respective payload and control multicast group addresses. There is further disclosed a system and method for implementing dispatch calls for members in multiple zones (FIG. 6). Zone controllers 630, 632 separately identify control multicast group addresses and send them to affiliating devices in their respective zones. A controlling zone controller 630 dynamically identifies a payload multicast group address that is used by participating devices in both zones. The participating sites 606, 616 issue Join commands to associated network devices 610, 622 to receive payload messages addressed to the payload multicast group address and control messages addressed to their control multicast group address.

31 Claims, 9 Drawing Sheets

METHODS FOR IMPLEMENTING A TALKGROUP CALL IN A MULTICAST IP NETWORK

FIELD OF THE INVENTION

This invention relates generally to communication systems, and particularly communication systems incorporating multicast internet protocol (IP) addressing.

BACKGROUND OF THE INVENTION

Communication systems typically include a plurality of communication units, such as mobile or portable radio units and dispatch consoles that are located at multiple sites. Typically, the various sites include base site repeaters ("repeaters") for transceiving information such as control, voice, data and network management traffic between the communication units and each other. The communication units are often logically divided into various subgroups, known as talkgroups, which can be made up of communication units at different sites desiring to participate in a group or dispatch call. A dispatch call is one in which members of a particular talkgroup can communicate with each other via communication links established between multiple endpoints, such as voice repeaters and dispatch console positions.

There are a variety of architectures that will support group or dispatch call connections between multiple endpoints. Perhaps the most commonly known is a "circuit-switched" architecture in which at least one base station or repeater at each site is linked, through dedicated or on-demand circuits, to a central radio system switching point ("central switch") in what is often called a "star" configuration. Some very large systems use a hierarchy of such "stars" where intermediate processors group the links from multiple cell sites and do some lower level processing on them before passing them up to the central switch. In either case, the circuits providing connectivity to the central switch require a dedicated wire for each endpoint whether or not the endpoint is participating in a particular call.

Next generation radio systems propose to employ multicast addressing protocols, such as multicast Internet Protocol (IP) for providing group or dispatch call services. One example is U.S. patent application Ser. No. 09/283,121, titled "Wireless Communication System Incorporating Multicast Addressing and Method For Use," assigned to Motorola, Inc. and incorporated herein by reference in its entirety. Generally, IP multicasting protocols provide one-to-many or many-to-many communications capability in a connectionless packet network. The network defines a spanning tree of router interfaces and necessary routes between those interfaces to provide multicast distribution of data with a minimum amount of data replication. Moreover, with multicast routing protocols, there is no need for dedicated bandwidth to each endpoint, thus dispatch service can be provided relatively more efficiently and less costly than in traditional circuit-switched networks.

Because networks using IP multicasting protocols offer several advantages relative to traditional circuit-switched networks, there is a continuing need to develop and refine communication architectures using IP multicasting, particularly for implementing dispatch calls with multiple endpoints. As such, there is a need to define systems and methods for endpoints, including base site voice repeaters and dispatch consoles, to use various components of an IP multicast network for setting up and ending talkgroup calls. The present invention is directed to satisfying these needs.

BRIEF DESCRIPTION OF THE DRAWINGS

The foregoing and other advantages of the invention will become apparent upon reading the following detailed description and upon reference to the drawings in which.

DESCRIPTION OF PREFERRED EMBODIMENTS

Figure 1:
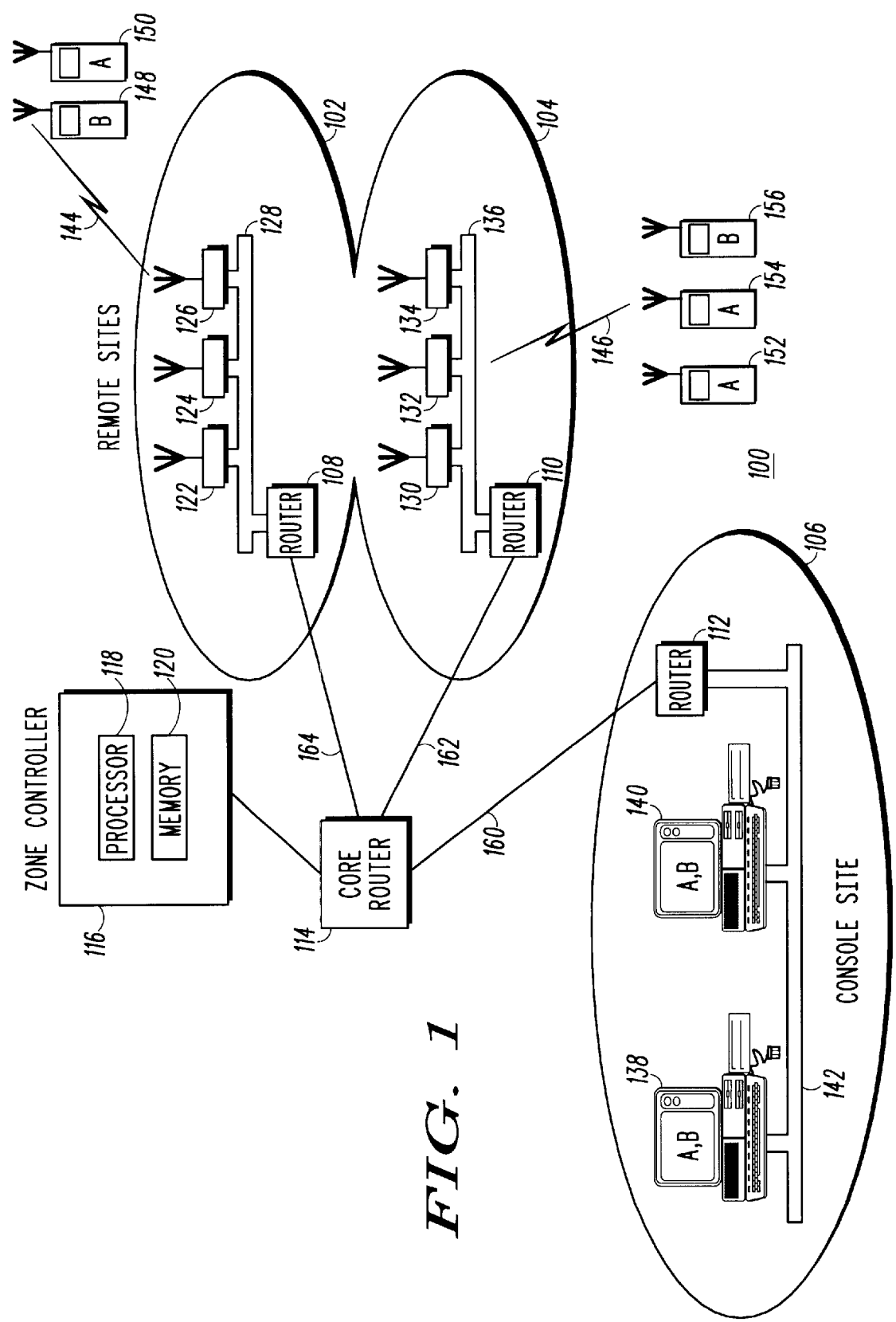
FIG. 1 is a block diagram of an IP multicast communication system according to the invention.

The following describes systems and methods for implementing dispatch calls using IP multicasting protocols in single-zone and multiple-zone architectures.

In one embodiment of the present invention, there is provided a method utilizing a payload multicast group address for distributing payload to participating devices in a talkgroup call. The payload multicast group address is identified upon receiving a request for a talkgroup call and distributed to the participating devices in a call grant message. Upon receiving the payload multicast group address, the participating devices issue commands to one or more network devices that enable them to receive payload messages via the payload multicast group address. Payload message(s) sourced from a communication device are addressed to the payload multicast group address and sent to the participating devices via the one or more network devices.

In another embodiment of the present invention, there is provided a method utilizing a control multicast group address for distributing control messages to participating devices in a talkgroup call. The control multicast group address is identified upon receiving an affiliation request for a talkgroup call and distributed to the participating devices in an affiliation acknowledgement. Upon receiving the control multicast group address, the participating devices issue commands to one or more network devices that enable them to receive control messages via the control multicast group address. Control message(s) addressed to the control multicast group address are sent to the participating devices via the one or more network devices.

In still another embodiment of the present invention, there is provided a method for distributing communication information between members of a talkgroup distributed among different zones. The method comprises identifying a plurality of multicast group addresses to be used for distributing communication information to the talkgroup, including a single payload multicast group address and separate control multicast group addresses in each zone. Optionally, there may be provided separate payload multicast group addresses in each zone, a single control multicast group address, or a single multicast address may be used for both payload and control messages in one or both zones. Upon receiving the multicast group address, the participating devices join the addresses and receive communication information (e.g., payload and control messages) via those multicast group addresses.

In yet another embodiment of the present invention, there is provided a communication system operable to implement a talkgroup call using a payload multicast group address. The communication system includes a controller being operable to receive, from a communication source, a request for a talkgroup call, and identify a payload multicast group address to be used for distributing payload to one or more participating devices for the call. A packet network distributes the payload multicast group address to the participating devices. The participating devices include means for receiving the payload multicast group address and means for issuing commands to one or more network devices that enable the participating devices to receive payload messages via the payload multicast group address. The communication system includes means for sending, from the communication source to the one or more network devices, at least one payload message addressed to the payload multicast group address; and means for sending the at least one payload message from the one or more network devices to the participating devices.

In still yet another embodiment of the present invention, there is provided a communication system using a control multicast group address for sending control messages to members of a talkgroup call. The communication system includes a controller being operable to receive, from a communication device, an affiliation request for a talkgroup, and send an affiliation acknowledgement to the device containing a control multicast group address to be used for control signaling the talkgroup. The communication device includes means for receiving the affiliation acknowledgement containing the control multicast group address and means for issuing a command to a network device to enable the communication device to receive at least one control message via the control multicast group address. The communication system includes means for sending, from the network device to the communication device, at least one control message addressed to the control multicast group address.

In a still further embodiment of the invention, there is provided a multi-zone communication system operable to implement a talkgroup call. The communication system comprises a plurality of communication zones and a plurality of communication devices distributed among the plurality of communication zones. The communication system includes means for defining a talkgroup from among communication devices in the different zones, and means for identifying multicast group addresses (e.g., payload and control multicast group addresses) to be used for distributing communication information to the talkgroup. A packet network distributes the multicast group addresses to the communication devices participating in the talkgroup. The communication devices include means for receiving the multicast group addresses, means for joining the multicast group addresses, and means for receiving communication information via the multicast group addresses.

Turning now to the drawings and referring initially to FIG. 1, there is shown an IP multicast communication system (or "network") 100 comprising a plurality of sites 102, 104, 106 that are coupled, via respective routers 108, 110, 112 to a core router 114. The routers 108–114 may comprise, for example, 3Com "NetBuilder" series routers. The core router 114 is coupled to a zone controller 116 having a processor 118 (such as a microprocessor, microcontroller, digital signal processor or combination of such devices) and a memory 120 (such as volatile or non-volatile digital storage devices or combination of such devices). In one embodiment of the present invention, the zone controller 116 manages and assigns IP multicast addresses for payload (voice, data, video, etc.) and control messages between and among the various sites 102, 104, 106.

As depicted in FIG. 1, site 102 includes a plurality of repeaters 122, 124, 126 that are coupled, via Ethernet 128 to an associated router 108. Similarly, site 104 includes a plurality of repeaters 130, 132, 134 that are coupled, via Ethernet 136 to router 110. Generally, the repeaters at the various sites 102, 104 communicate, via wireless communication resources 144, 146 with a plurality of subscriber units 148–156, which may comprise mobile or portable wireless radio units. Suitable wireless communication resources 144, 146 are multiple RF (radio frequency) channels such as pairs of frequency carriers, time division multiple access (TDMA) slots, code division multiple access (CDMA) channels, or any other RF transmission media. In the case where the communication resources comprise RF channels, it is common to assign separate channels and/or separate repeaters for different types of communication traffic. Thus, the repeaters at the various sites 102, 104 may comprise control channel repeaters, voice channel repeaters and/or link repeaters. For convenience, the term "repeater site" or simply "base site" will be used hereinafter instead of referring specifically to the repeater(s) at a particular site. In contrast, site 106 includes a plurality of dispatch consoles 138, 140 that are coupled via Ethernet 142 to router 112 and defines a "console" site. Consoles 138, 140 may comprise wireless or wireline consoles. Although not shown in FIG. 1, it will be appreciated that a single site may include both repeaters and console positions.

Practitioners skilled in the art will appreciate that the network 100 may include various other communication devices not shown in FIG. 1. For example, the network 100 may include wireline communication device(s), site controller(s), comparator(s), telephone interconnect device (s), internet protocol telephony device(s), call logger(s), scanner(s) and gateway(s). Generally, such communication devices may be either sources or recipients of payload and/or control messages routed through the network 100. These devices are described briefly below.

A site controller is a device having a processor (such as a microprocessor, microcontroller, digital signal processor or combination of such devices) and a memory (such as volatile or non-volatile digital storage devices or combination of such devices), that may be located at a particular site. A site controller may be used to control the communication of payload and/or control messages between repeater(s) at a particular site. A site controller may also control communications between the repeater(s) and their associated router. In one embodiment, for example, a site controller sends IGMP Leave and Join messages to a router associated with a particular site to enable the repeater(s) at that site to receive payload and/or control messages addressed to particular multicast group address(es).

A comparator (or "voter") is a device, usually connected by wireline to various receivers (e.g., different repeaters) receiving different instance(s) of a particular message or signal (e.g., from a subscriber radio unit). The comparator receives and compares among the different instances of the signal that may be received by the different receivers, and produces an output message that is comprised of either an entire message from one of the receivers or a composite message comprised of segments of the message received from one or more of the receivers. Each message may be comprised of a plurality of message frames.

A scanner is a receiver that is adapted to monitor message transmissions from communication devices such as mobile or portable wireless radio units, consoles, repeaters, and the like. In one mode of operation, for example, a scanner scans the radio spectrum for the purpose of finding and, optionally, locking on to carrier frequencies containing message transmissions. Scanners are sometimes used by parties that are not intended recipients of the message transmissions and thus may or may not be members of a particular talkgroup for which the message transmissions are intended.

A telephone interconnect device is a network-based device that provides voice transcoding services between mobile and land line subscribers when invoking full duplex telephone calls between those two subscribers. A transcoding service is required, for example, when a mobile subscriber using ACELP vocoding requests a call to a subscriber in the public switched telephone network (PSTN) using 64-kilobit per second PCM vocoding.

An internet protocol telephony device comprises a telephone that transports voice and/or control messages over a LAN to a telephony gateway box, which interfaces multiple (LAN based) phones and converts the IP control and audio packets back into the format of the local PSTN. More generally, a gateway device is one that provides voice and control translation services between two dissimilar communication systems. For example, a gateway device would be required if an APCO system were to be connected to a GSM system. Other services such as feature translation, authentication, authorization and encryption could also be provided by a gateway device.

A call logger is a networked based device that records packetized voice talkgroup and private calls in a public safety system. A call logger could also record data calls. A call logger device typically stores the voice payload in its native format (i.e. vocoded audio). When it is desirable to playback the voice conversation at a later time, the call logger retrieves and decodes all packets which bound the call in question.

As shown in FIG. 1, the plurality of subscriber units 148–156 are arranged into talk groups having corresponding talk group identifications as known in the art. Any number of talk groups having corresponding talk group identifications can be established within the system 100. In FIG. 1, two separate talk groups are shown, identified by labels "A" and "B." Talk group "A" at least includes the subscriber units 150, 152, 154 and talk group "B" at least includes the subscriber units 148, 156. Console positions 138, 140 can affiliate with either, or both talkgroups "A" and "B" and, accordingly, may be considered members of both talk groups "A" and "B."

According to a preferred embodiment of the present invention, the zone controller 116 dynamically assigns and manages respective payload and control IP multicast addresses for payload (voice, data, video, etc.) and control messages between and among participating talkgroup members at the various sites 102, 104, 106. That is, multicast group addresses for particular talkgroups are not fixed (and therefore, are not stored in memory of devices distributed throughout the network) but rather are identified and assigned by the zone controller 116 on a call-by-call basis. As such, a particular multicast group address is only temporarily assigned to any one call and can be reassigned to different calls as needed or desired. Dynamic, rather than static assignment of addresses is advantageous in terms of efficient use of resources in the network. One reason is because, in the static example, various multicast addresses (perhaps hundreds) associated with all of the different talkgroups in the network must be stored in the memory of various network devices, even though less than all of the talkgroups are generally active at any particular time. Moreover, even among talkgroups that are active, those talkgroups may not require use of all the network devices, for example, if they do not have members at each site. Thus, dynamic assignment of addresses is preferred. Alternatively, however, static assignment of addresses can be done.

Multipoint routes pertaining to the IP multicast addresses used in the present invention are maintained by the routers 108–114 forming the network 100. IP Multicast is based on the well-known Internet Group Management Protocol (IGMP) which allows a multicast router to track the existence of multicast group members on local networks coupled to that router. Additionally, multicast routers use the information provided by IGMP in conjunction with a multicast routing protocol to support forwarding of data across a network of routers. Given the nature of wireless communication systems, sparse mode protocols such as the Core Based Tree (CBT) protocol and the Protocol Independent Multicast—Sparse Mode (PIM-SM) protocol are preferred multicast routing protocols for use in the present invention. However, it is anticipated that dense mode protocols such as the Distance Vector Multicast Routing Protocol (DVMRP), the Multicast Open Shortest Path First (MOSPF) protocol, the Protocol Independent Multicast—Dense Mode (PIM-DM) protocol or other protocols that may be devised in the future may also be used to implement the present invention. A common feature of these multicast routing protocols is that each establishes a "spanning tree" which, for a given multicast group, defines all of the router interfaces which contain group members and the necessary routes between these interfaces to provide the multicast distribution with a minimum amount of data replication.

Figure 2A:
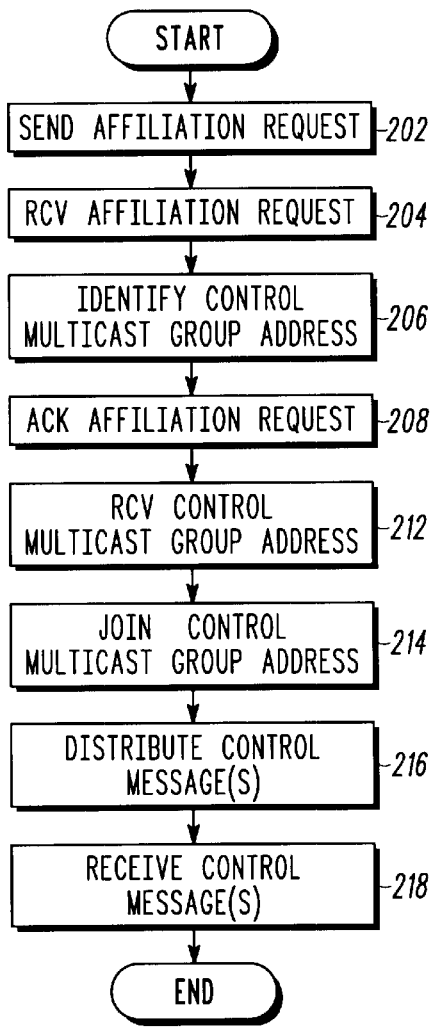
FIG. 2A is a flowchart illustrating the affiliation of communication devices to a talkgroup using an IP control multicast address according to the invention.

Referring now to FIG. 2A, a method for affiliating a communication device to a talk group is shown. The communication device may comprise, for example, a subscriber unit, such as a wireless mobile or portable radio, a wireline communication device, console (wireless or wireline), repeater/base station, site controller, comparator/voter, scanner, site controller, telephone interconnect device or internet protocol telephony device. The steps of FIG. 2A are implemented, where applicable, using stored software routines within the communication device, zone controller 116 or routers forming the network 100. At step 202, the communication device sends an affiliation request for a particular talkgroup to the zone controller 116. This is typically performed upon power up (or, in the example of a mobile or portable device, when the device roams between sites). Upon receiving the affiliation request at step 204, the zone controller 116 identifies at step 206 a control multicast group address that is to be used for subsequent multicast control plane traffic for that particular talkgroup and returns an affiliation acknowledge ("ACK") message at step 208 to the communication device. In a preferred embodiment, the control multicast group address is identified dynamically and is included in the ACK message sent to the communication device. Alternatively, the control multicast group addresses for particular talkgroups may be fixed and/or sent separately from the ACK message. In still another embodiment, the ACK message may include a payload multicast group address that is to be used for payload message traffic for the talkgroup.

Upon receiving the control multicast group address at step 212, the communication device "joins" the IP multicast group address at step 214. In one embodiment, this is accomplished by the communication device sending an Internet Group Management Protocol (IGMP) Join message to its associated multicast router. The routers of the network set up the spanning tree of router interfaces enabling multicast distribution of control messages throughout the talkgroup. In one embodiment, each branch of the tree is set up by the router associated with the affiliating communication device sending PIM-SM "Join" messages to a core router. Once the router interfaces are established, the communication device(s) continue to be joined to the IP multicast group address as long as they are affiliated to the talkgroup. During such time, control messages addressed to the control multicast group address are distributed at step 216 by the router(s) and received at step 218 by the communication device(s).

For example, consider the case of the console(s) 138, 140 (FIG. 1) desiring to affiliate with talkgroups "A" and "B." The console(s) 138, 140 determine the IP address of the zone controller 116 through a well-known discovery protocol, then send affiliation requests for talkgroups "A" and "B" to the zone controller 116. The zone controller 116 returns affiliation ACK messages identifying control multicast group addresses associated with talkgroups "A" and "B." The consoles 138, 140 send IGMP "Join" messages for the identified control multicast group addresses associated with talkgroups "A" and "B" to their associated router 112 which, in turn sends a PIM-SM "Join" message to the core router 114, thereby setting up branch 160 of the spanning tree of router interfaces. As long as the consoles 138, 140 remain affiliated with talkgroups "A" and "B," they will receive control messages addressed to the control multicast group addresses associated with those talkgroups.

Subscriber units affiliate with the talkgroups in generally the same manner as the consoles, by sending affiliation requests for talkgroups "A" or "B" to the zone controller 116. For example, subscriber unit 150 sends an affiliation request for talkgroup "A" and subscriber unit 148 sends an affiliation request for talkgroup "B." The zone controller 116 returns affiliation ACK messages identifying the control multicast group addresses for talkgroups "A" and "B." The repeaters associated with subscriber units 148, 150 send IGMP "Join" messages to their associated router 108 which, in turn sends a PIM-SM "Join" message to the core router 114, thereby setting up branch 164 of the spanning tree of router interfaces. As long as the subscriber units 148, 150 remain affiliated with their respective talkgroups "A" and "B," the subscriber units' currently affiliated base sites will receive control messages addressed to the control multicast group addresses associated with those talkgroups.

Figure 2B:
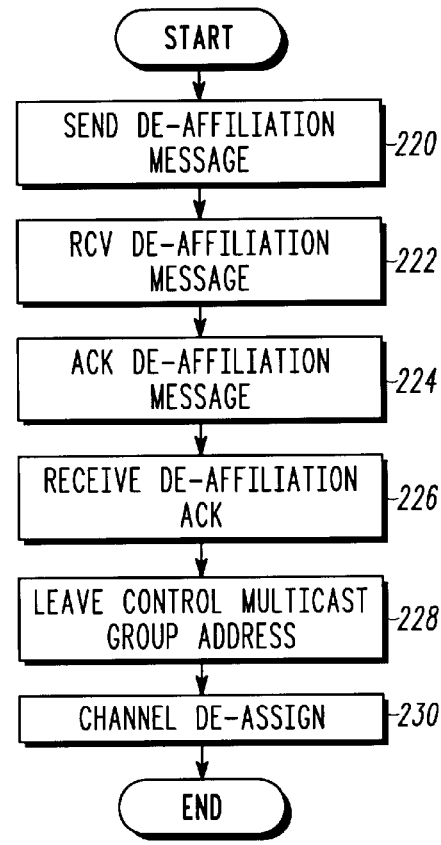
FIG. 2B is a flowchart illustrating the de-affiliation of communication devices from a talkgroup using an IP control multicast address according to the invention.

FIG. 2B shows a method for a communication device to deaffiliate with a talkgroup. At step 220, the communication device sends a deaffiliation message for a particular talkgroup to the zone controller 116. Upon receiving the deaffiliation message at step 222, the zone controller 116 returns a deaffiliation acknowledge ("ACK") message at step 224 to the communication device. Upon receiving the deaffiliation ACK message at step 226, the communication device sends a IGMP "Leave" message at step 228 to its associated multicast router to signify its desire to leave that IP multicast group address. The routers of the network ultimately break down the spanning tree of router interfaces, after having received IGMP "Leave" message(s) from the endpoints of the talkgroup, by sending PIM-SM "Leave" messages between routers. Communication resources supporting the control messaging between the repeaters and subscriber units are deassigned at step 230.

Figure 3A:
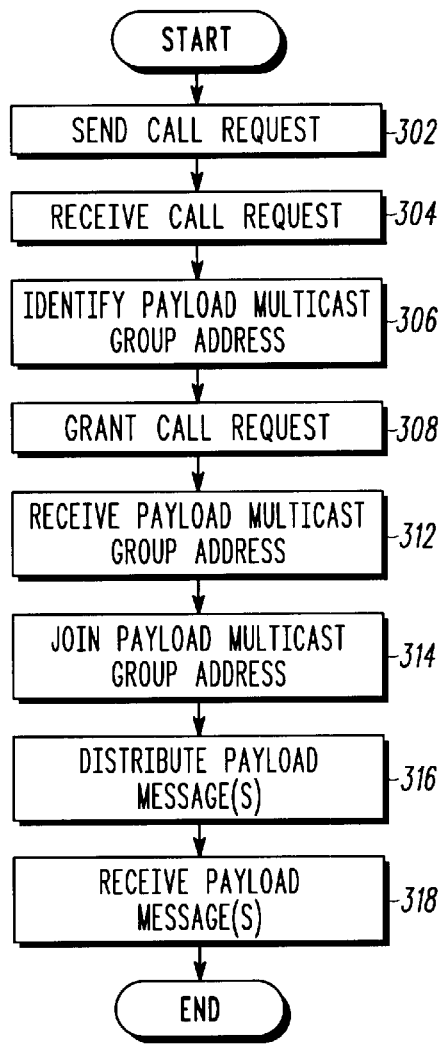
FIG. 3A is a flowchart illustrating the setting up of a talkgroup call using an IP payload multicast address according to the invention.

Referring now to FIG. 3A, there is shown a method for setting up of a talkgroup call using IP payload multicast addressing. The steps of FIG. 3A are implemented, where applicable, using stored software routines within the communication devices, zone controller 116 or routers forming the network 100. At step 302, a sourcing communication device ("communication source") sends a call request for a particular talkgroup to the zone controller 116. The communication source may comprise, for example, a subscriber unit, such as a wireless mobile or portable radio, a wireline communication device, console (wireless or wireline), repeater/base station, site controller, comparator/voter, scanner, site controller, telephone interconnect device or internet protocol telephony device.

Upon receiving the call request at step 304, the zone controller 116 identifies at step 306 a payload multicast group address that is to be used for distributing payload to one or more participating devices for the call. The payload may comprise, for example, audio (including but not limited to voice), video, data, multimedia, etc. Generally, the participating devices comprise those communication devices that are able to instruct an associated router to join (or leave) the payload multicast group address, so that the participating devices may receive (or stop receiving) payload addressed to the payload multicast group address. The participating devices may comprise, for example, mobile or portable radio(s), wireline communication device(s), console(s) (wireless or wireline), repeater/base station(s), call logger (s), CALEA gateway(s), telephone interconnect device(s) and/or internet protocol telephony device(s) affiliated with the talkgroup.

At step 308, the zone controller returns call grant messages to the communication source and the various participating devices in the talkgroup. In a preferred embodiment, the payload multicast group address is identified dynamically, on a call-by-call basis and is included in the call grant messages sent to the various talkgroup members participating in that call. Alternatively or additionally, fixed payload multicast group addresses for various talkgroups may be stored in memory and then recalled upon receiving call request(s), as appropriate. The payload multicast group addresses might also be included in the ACK messages that are sent upon the talkgroup members affiliating with the talkgroup. Finally, the payload multicast group addresses might be stored in memory in the participating devices and recalled upon receiving the call grant message(s), as appropriate.

Figure 4:
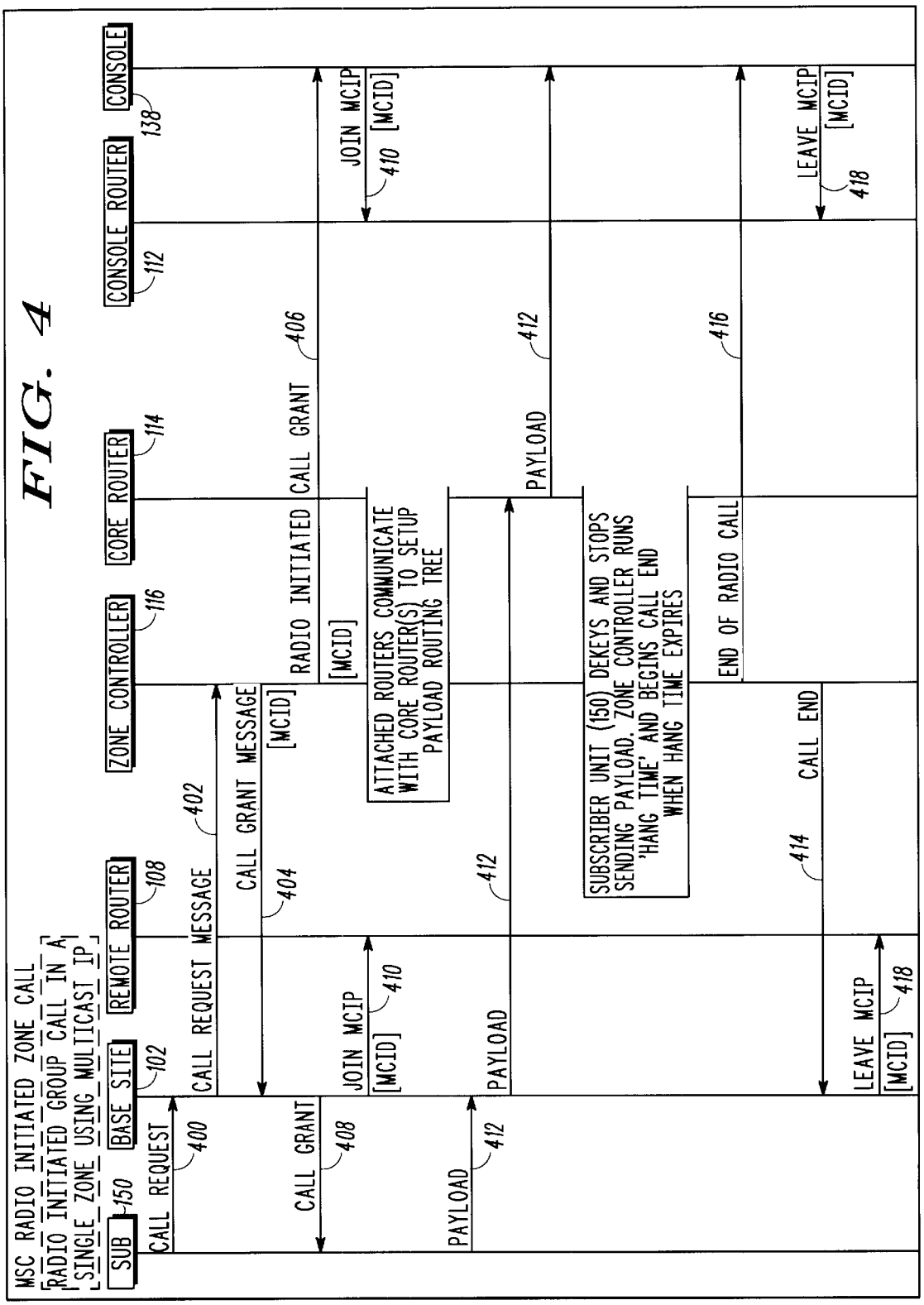
FIG. 4 is a message sequence chart associated with a subscriber initiated talkgroup call according to the invention.
Figure 5:
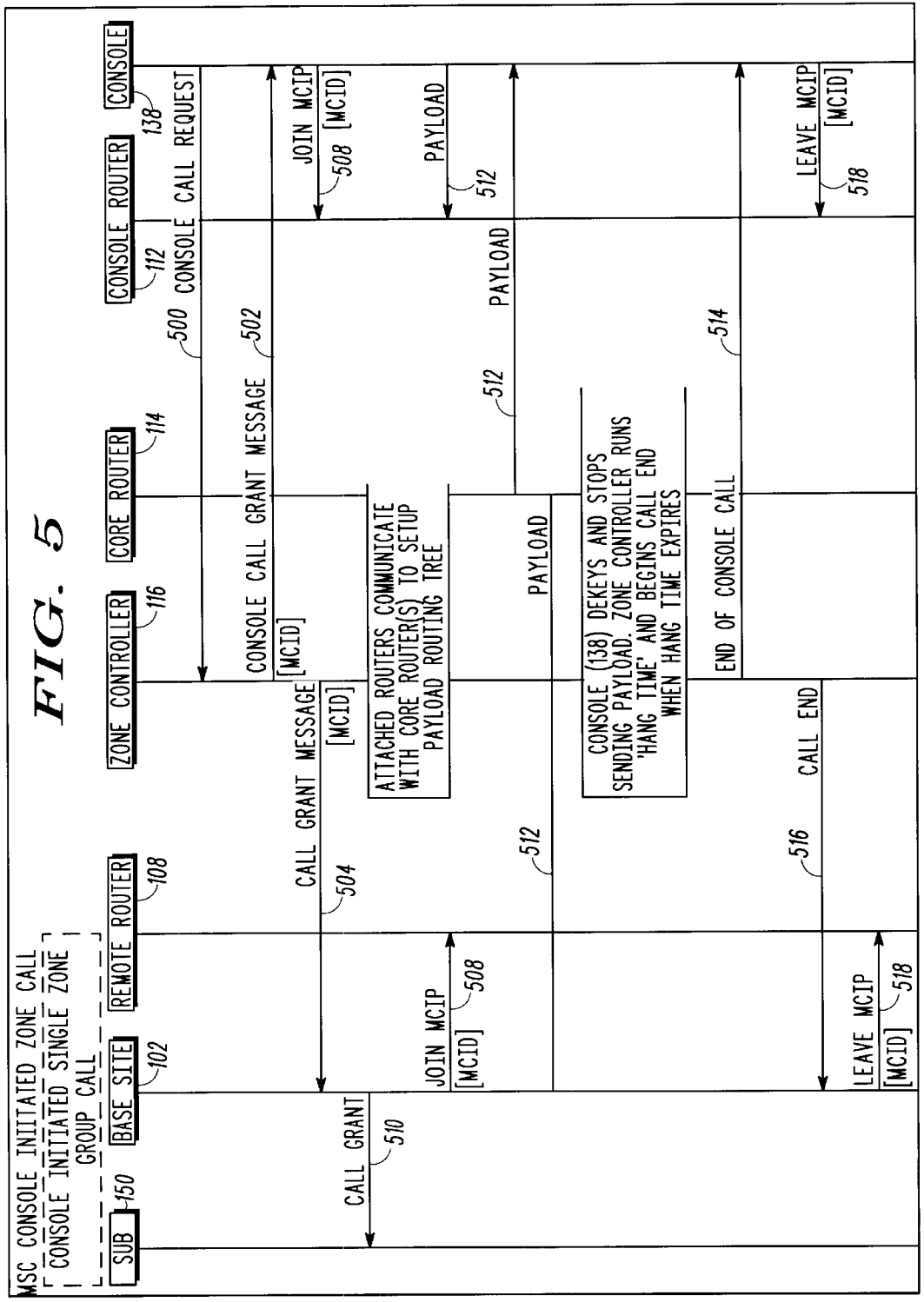
FIG. 5 is a message sequence chart associated with a console initiated talkgroup call according to the invention.

For example, message sequence charts associated with subscriber radio and console initiated talkgroup calls are shown at FIG. 4 and FIG. 5, respectively. First consider the example of a radio initiated talkgroup call, sourced by subscriber unit 150. The subscriber unit 150 sends a Call Request 400 to its associated base site 102, which in turn sends a Call Request Message 402 to the Zone Controller 116. The zone controller 116 returns Call Grant Messages 404 to base site 102 and any other participating repeater sites (not shown in FIG. 4) that may be affiliated with the talkgroup. The various participating repeater sites then send Call Grant packets 408 to their associated subscriber unit(s). The zone controller 116 also sends a Radio Initiated Call Grant message 406 to any participating consoles (e.g., console 138). In one embodiment, both the Call Grant Message(s) 404 and Radio Initiated Call Grant messages 406 include the payload multicast group address, denoted MCID, associated with the talkgroup. In one embodiment, the Call Grant Message(s) 404 sent to the participating repeater sites comprise unicast IP packets and the Radio Initiated Call Grant message(s) 406 sent to the participating consoles comprise packets sent via the control multicast group address associated with the talkgroup.

Next consider the example of a console initiated group call, sourced by console 138. The sourcing console 138 sends a Console Call Request 500 to the Zone Controller 116, which returns Console Call Grant Message(s) 502 to console 138 and any other participating consoles (not shown in FIG. 5) that may be affiliated with the talkgroup. The zone controller 116 also returns Call Grant Message(s) 504 to base site 102 and any other participating repeater sites that may be affiliated with the talkgroup. The various participating repeater sites send Call Grant packets 510 to their associated subscriber unit(s). In one embodiment, both the Console Call Grant Message(s) 502 and Call Grant Message(s) 504 include the payload multicast group address, denoted MCID, associated with the talkgroup. In one embodiment, the Console Call Grant message(s) 502 sent to the participating consoles comprise packets sent via the control multicast group address associated with the talkgroup, whereas the Call Grant Message(s) 504 sent to the participating repeater sites comprise unicast IP packets.

Upon receiving the payload multicast group address (e.g., MCID) at step 312, participating repeater sites and consoles send IGMP "Join" messages to their associated routers at step 314 to signify their desire to join that IP multicast group address. In the example of FIG. 4, Join MCIP packets 410 are sent from base site 102 to its associated router 108 and from console 138 to its associated router 112. Join messages from other participating devices (not shown) are accomplished in similar fashion. Similarly, in the example of FIG. 5, Join MCIP packets 508 are sent from console 138 to its associated router 112 and from base site 102 to its associated router 108. Join messages from other participating devices (not shown) are accomplished in similar fashion. In one embodiment, the Join message(s) from the participating repeater sites are sent from a Voice Channel Repeater at those sites. Alternatively, the Join message(s) may be sent from site controller(s) associated with the participating repeater sites.

Upon receiving the "Join" messages, the routers of the network create routing table entries to form the spanning tree between the participating devices of the talkgroup. In one embodiment, this is accomplished by the routers 108, 110, 112 associated with the various participating devices sending PIM-SM "Join" messages to the core router 114. Once the router interfaces are established, payload messages addressed to the payload multicast group address are distributed at step 316 by the router(s) and received at step 318 by the participating devices. In the example of FIG. 4, subscriber unit 150 sources a payload 412 that is sent to its associated base site 102. The base site 102 sends the payload 412, via its associated router 108 and core router 114, to the participating console 138. The payload 412 is distributed to other participating devices (not shown) in similar fashion. In the example of FIG. 5, the sourcing console 138 sends a payload 512 that is sent, via its associated router 112 and core router 114, to the participating repeater site 102. The payload 512 is distributed to other participating devices (not shown) in similar fashion.

Figure 3B:
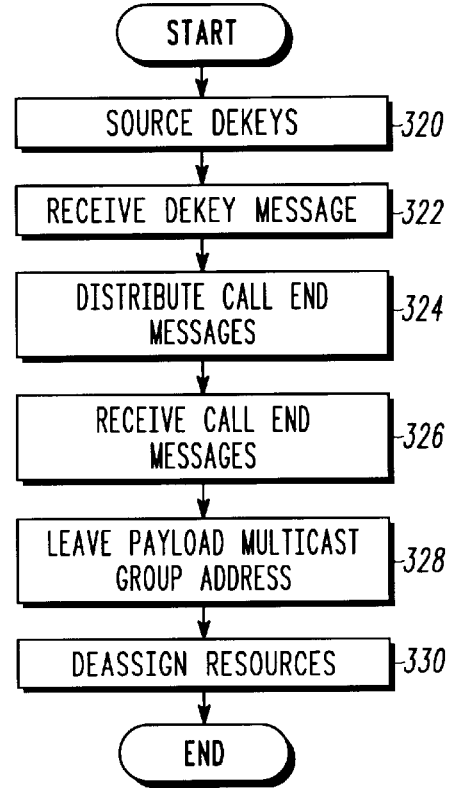
FIG. 3B is a flowchart illustrating the ending of a talkgroup call using an IP payload multicast address according to the invention.

FIG. 3B shows a method for ending a talkgroup call. The method begins at step 320 with the sourcing communication unit sending a dekeying message to the zone controller 116. The Zone Controller receives the dekey message at step 322. Upon receiving the dekeying message, and after a "hang time" has expired, the Zone Controller 116 proceeds to end the call by distributing call end messages at step 324 to the participating communication devices. The participating devices receive the call end messages at step 326. Turning to the message sequence chart associated with a radio initiated call (FIG. 4), the zone controller 116 sends a Call End message 414 to the site 102 and an End of Radio Call packet 416 to console 138. Call End message(s) 414 or End of Radio Call packet(s) 416 are sent from the zone controller to any other participating sites and/or consoles in similar fashion. In one embodiment, the Call End message(s) 414 sent to the participating repeater sites comprise unicast IP packets, whereas the End of Radio Call packet(s) 416 sent to the consoles comprise packets sent via the control multicast group address associated with the talkgroup. In the example of a console initiated talkgroup call (FIG. 5), the zone controller 116 sends an End of Console Call packet 514 to console 138 and a Call End message 516 to the site 102. End of Console Call packet(s) 514 or Call End message(s) 516 are sent from the zone controller to any other participating sites and/or consoles in similar fashion.

At step 328, the participating repeater sites and consoles send IGMP "Leave" messages to their associated routers to signify their desire to leave that IP multicast group address. In the example of FIG. 4, Leave MCIP packets 418 are sent from base site 102 to its associated router 108 and from console 138 to its associated router 112. Leave messages from other participating devices (not shown) are accomplished in similar fashion. Similarly, in the example of FIG. 5, Leave MCIP packets 518 are sent from console 138 to its associated router 112 and from base site 102 to its associated router 108. Leave messages from other participating devices (not shown) are accomplished in similar fashion. In one embodiment, the Leave message(s) from the participating repeater sites are sent from a Voice Channel Repeater at those sites. Alternatively, the Leave message(s) may be sent from site controller(s) associated with the participating repeater sites. Upon receiving the "Leave" messages, the routers of the network disassemble the spanning tree between the participating devices of the talkgroup. In one embodiment, this is accomplished by the routers sending PIM-SM "Leave" messages between routers. At step 330, the Zone Controller deassigns communication resources.

Figure 6:
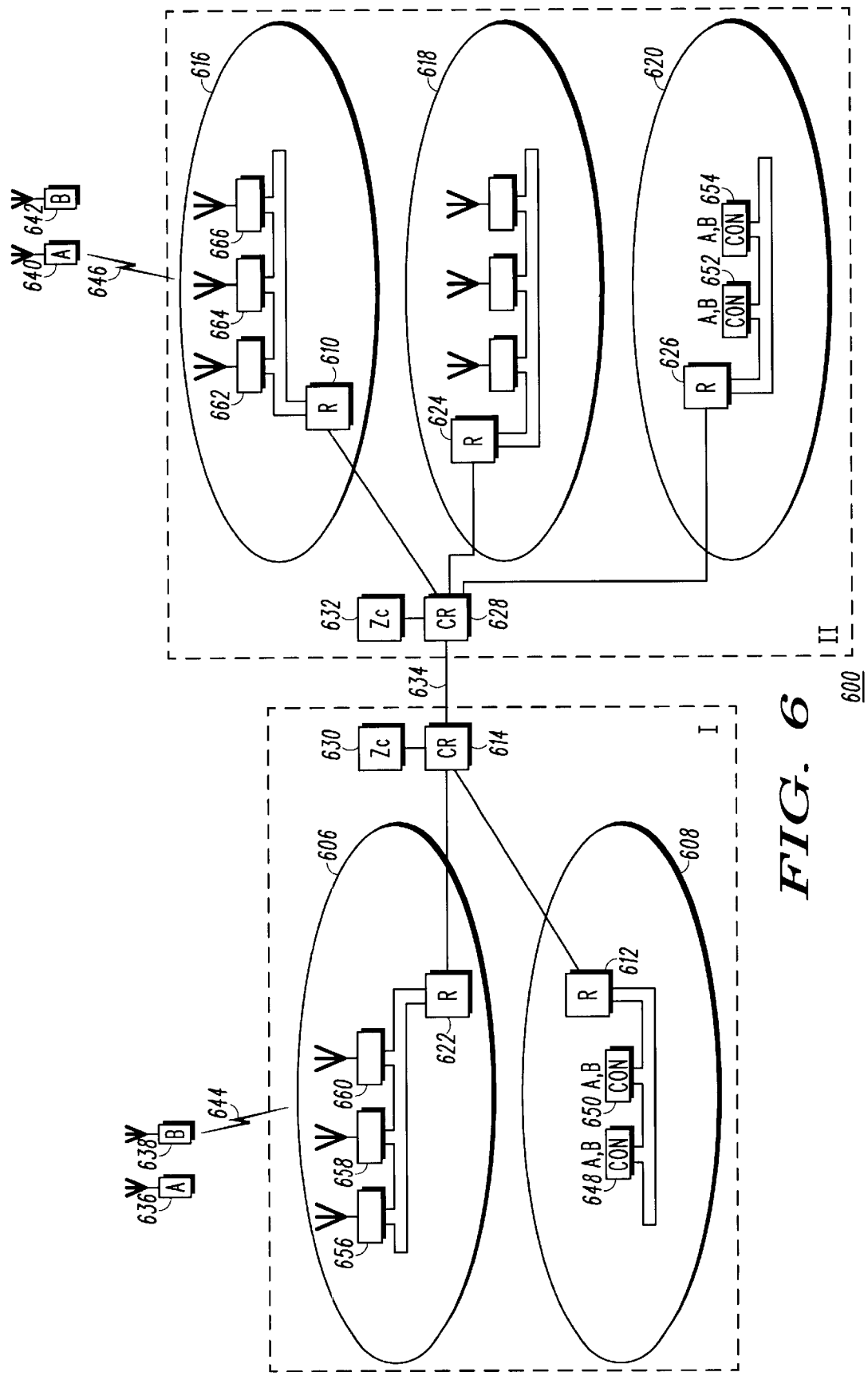
FIG. 6 is a block diagram of a multi-zone IP multicast communication system according to the invention.

Now turning to FIG. 6, there is shown a multi-zone IP multicast communication system ("network") 600. For convenience, two zones I, II are shown in FIG. 6. However, it will be appreciated that the multi-zone network 600 may include virtually any number of zones. Generally, each zone I, II includes a plurality of sites that are coupled, via respective routers to a core router. Communication devices such as subscriber units, consoles, base site repeaters, and the like are distributed among the various sites. As shown, zone I includes sites 606, 608 that are coupled, via respective routers 610, 612 to a core router 614. Zone II includes sites 616, 618, 620 that are coupled, via respective routers 622, 624, 626 to a core router 628. The core routers 614, 628 are coupled to respective zone controllers 630, 632 having a processor and a memory, generally as described in relation to FIG. 1. The core routers 614, 620 are connected to each other via link 634 which may comprise, for example, T-1 or E-1 digital carrier systems.

As shown, sites 606, 616, 618 are repeater sites, each including a plurality of repeaters coupled, via Ethernet to their associated router. The repeaters may comprise control channel repeaters, voice channel repeaters and/or link repeaters as noted in relation to FIG. 1. Sites 618, 620 are console sites, each including a plurality of dispatch consoles coupled, via Ethernet to their associated router. However, each site may include both repeaters and console positions. Generally, the repeater sites communicate, via wireless communication resources, with a plurality of subscriber units. The subscriber units may comprise mobile or portable radio units divided among various talkgroups as described in relation to FIG. 1. For convenience, only four subscriber units are shown in FIG. 6. In zone I, subscriber units 636, 638 communicate, via wireless communication resource 644, with repeater site 606. In zone II, subscriber units 640, 642 communicate, via wireless communication resource 646, with repeater site 616.

Figure 7:
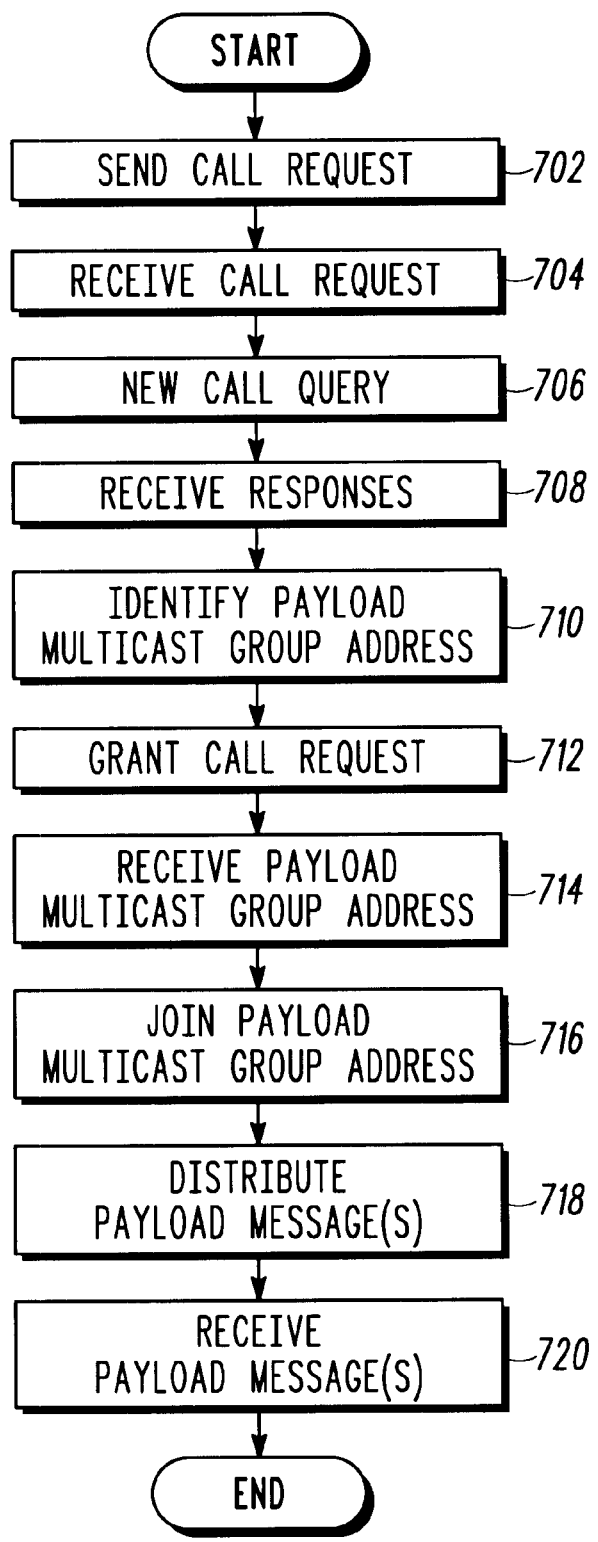
FIG. 7 is a flowchart illustrating the setting up of a multi-zone talkgroup call using an IP payload multicast address according to the invention.

Referring now to FIG. 7, there is shown a method for setting up of a multi-zone talkgroup call using IP payload multicast addressing. The steps of FIG. 7 are implemented, where applicable, using stored software routines within the communication devices, zone controllers and routers forming the network 600. It is assumed that participating devices of the network 600 are affiliated with talkgroups, having received control payload multicast addresses, prior to performing the steps of FIG. 7. Affiliation of the subscriber units and consoles with talkgroups in each respective zone is accomplished in generally the same manner as described in relation to FIG. 2A.

In one embodiment, the zone controller of each zone independently assigns a control multicast address to the participating devices of the talkgroup in its zone. That is, participating devices of a particular talkgroup in the same zone will have the same control multicast address, but those in different zones will generally have different control multicast addresses. For example, in FIG. 6, subscriber unit 636 (site 606) and console 648 (site 608), both members of talkgroup "A" are in the same zone I, thus the repeater(s) associated with subscriber unit 636 will join the same control multicast group address as console 648. However, because subscriber unit 640 is in zone II, the repeater(s) associated with subscriber unit 640 will join a different control multicast group address, even though subscriber unit 640 is also a member of talkgroup "A." Alternatively, different devices (e.g., consoles and repeaters) in the same zone may use different control multicast group addresses. Separate multicast addresses in each zone (or in the same zone) is advantageous because it limits the scope of ACKs when Reliable Multicast is employed, and limits the scope of the multicast domain should one zone controller go into zone trunking. Alternatively, however, it will be appreciated that the same control multicast address could be assigned to all of the devices affiliated to a particular talkgroup, irrespective of their zone. It will further be appreciated that the control multicast group addresses may be assigned dynamically, on a call-by-call basis, or may be statically assigned to various talkgroups.

Figure 8A:
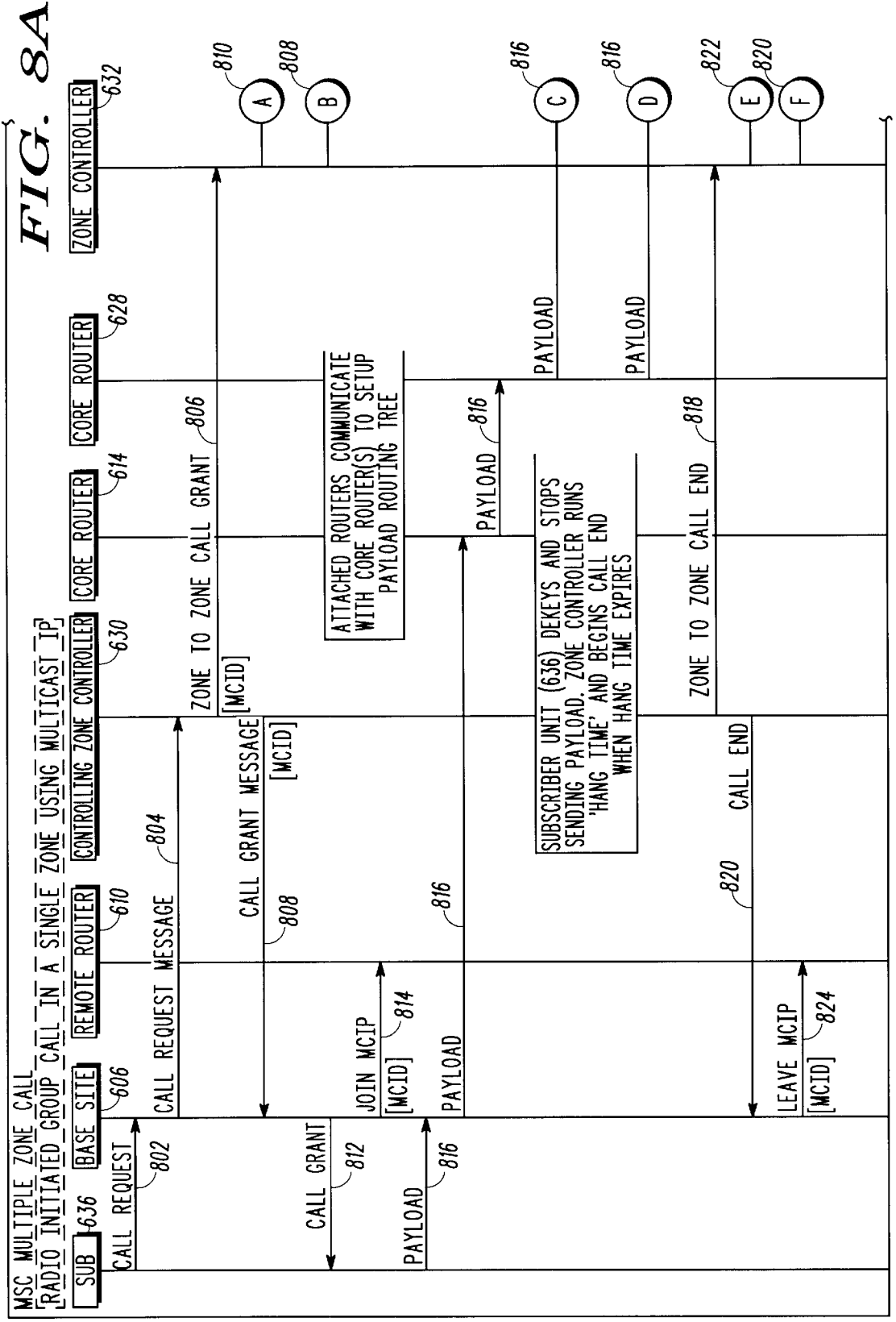
FIG. 8 is a message sequence chart associated with a subscriber initiated multi-zone talkgroup call according to the invention.
Figure 8B:
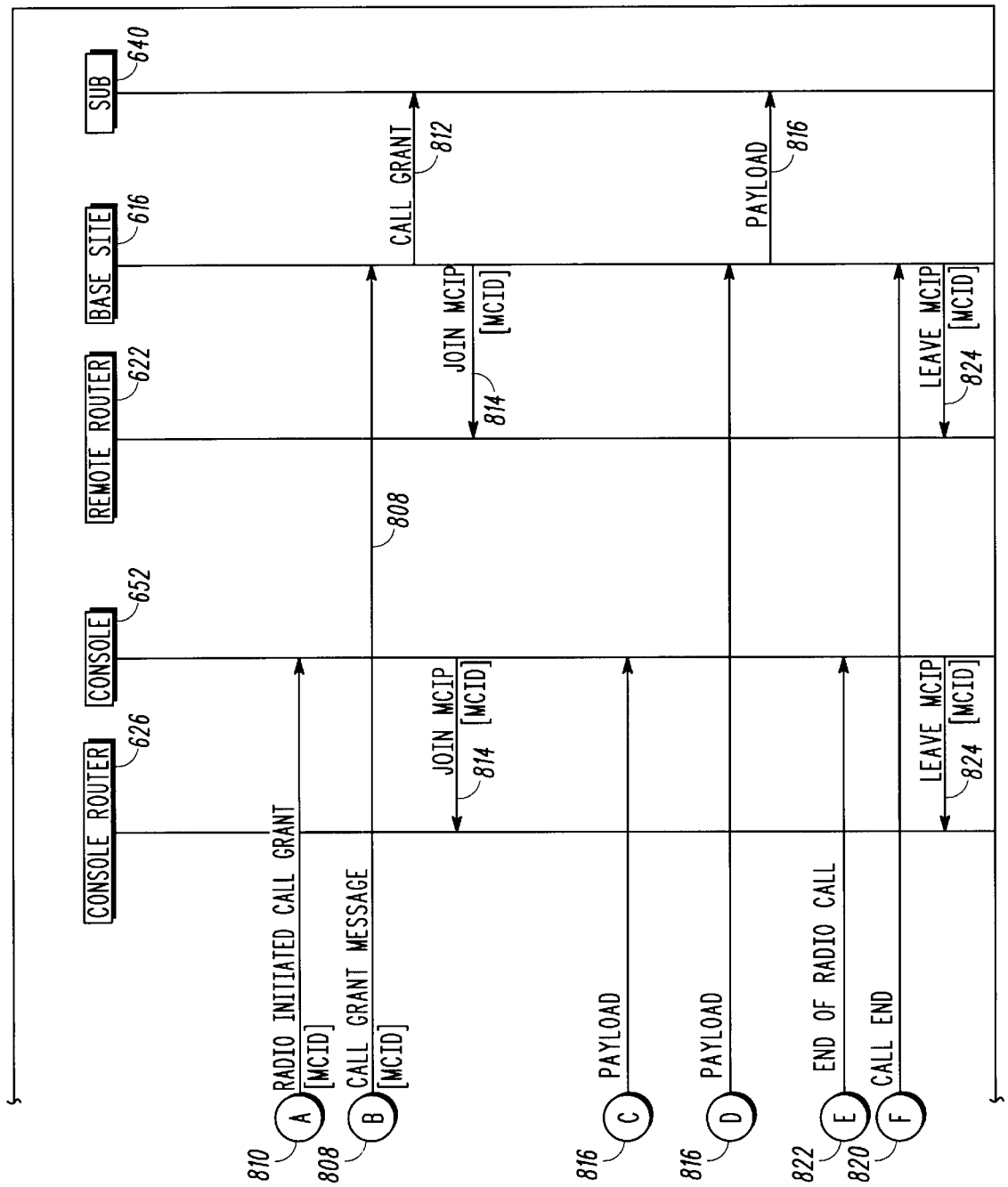

At step 702, a sourcing communication device ("communication source") sends a call request for a particular talkgroup to its zone controller. The communication source may comprise, for example, a wireless communication device, such as a mobile or portable radio, wireline communication device, console (wireless or wireline), repeater, site controller, comparator, telephone interconnect device or internet protocol telephony device. FIG. 8 shows a message sequence chart associated with a talkgroup call sourced by subscriber unit 636 (site 606, zone I). The subscriber unit 636 sends a Call Request 802 to its associated base site 606, which in turn sends a Call Request Message 804 to the controlling Zone Controller 116. In a preferred embodiment, the controlling zone controller is statically configured. That is, a designated one of the zone controllers is assigned to be the controlling zone controller. Alternatively, however, it is envisioned that the controlling zone controller may be defined on a call by call basis as the one of the zone controllers that is in the zone of the sourcing communication unit. That is, in the example of a call sourced from subscriber unit 640 (zone II), zone controller 632 would be the controlling zone controller.

Upon receiving the call request at step 704, the controlling zone controller 630 sends at step 706 a new call query (not shown in FIG. 8) to each participating zone controller, that is any other zone controller having communication device(s) affiliated to the particular talkgroup. At step 708, the controlling zone controller receives response(s) from the participating zone controller(s) indicating whether their respective zone(s) have voice resources available to support the call. When all the responses have been received, the controlling zone controller determines if the call will be granted. If the call is to be granted, the controlling zone controller identifies a payload multicast group address at step 710 and grants the call request at step 712. The payload multicast group address comprises an address that is to be used for distributing payload to one or more participating devices for the call, substantially as described in relation to FIG. 3A.

In a preferred embodiment, the payload multicast group address is identified by the controlling zone controller dynamically, on a call-by-call basis. Alternatively, static payload multicast group addresses associated with various talkgroup IDs may be stored in memory and then recalled, upon receiving a call request, as appropriate.

Upon granting the call, the controlling zone controller 630 (zone I) sends a Zone to Zone Call Grant packet 806, including the payload multicast group address, to participating zone controller 632 (zone II). Alternatively or additionally, the payload multicast group address may be passed to the participating zone controller in the new call query, before the call is granted. The controllers 630, 632 then send Call Grant Message(s) 808 to participating repeater sites and Radio Initiated Call Grant Messages 810 to participating console sites in their zones, as appropriate. In one embodiment, both the Call Grant Message(s) 808 and Radio Initiated Call Grant messages 810 include the payload multicast group address, denoted MCID, associated with the talkgroup. Specifically, with reference to FIG. 8, Call Grant Message(s) 808 are sent from zone controller 630 to base site 606, and from controller 632 to base site 616. The zone controller 632 further sends a Radio Initiated Call Grant Message 810 to console 652. In response to receiving the Call Grant Message(s) 808, the participating repeater sites 606, 616 send Call Grant packets 812 to their respective subscriber units 636, 640.

Upon receiving the payload multicast group address at step 714, the various participating communication devices send IGMP "Join" messages to their associated routers at step 716 to signify their desire to join that IP multicast group address. Using the example of FIG. 8, the repeater site 606 in Zone I associated with the sourcing subscriber unit 636 sends a Join MCIP packet 814 to its associated router 610. In zone II, the repeater site 616 associated with subscriber unit 640 sends a Join MCIP packet 814 to its associated router 622, and console 652 sends a Join MCIP packet 814 to its associated router 626. Upon receiving the "Join" messages, the routers 610, 612, 626 communicate with core routers 614, 628 to set up the spanning tree between the participating devices of the talkgroup.

Once the router interfaces are established, payload messages addressed to the payload multicast group address are distributed at step 718 by the router(s) and received at step 720 by the participating devices. In the example of FIG. 8, the subscriber unit 636 (zone I) sources a payload 816 to base site 606. The base site 606 sends the payload 816 to the core router 614, which sends the payload to the core router 628. The core router 628, in turn, sends the payload to the participating console 652 and base site 616 in zone II. The payload 816 is distributed to any other participating devices (not shown) in similar fashion.

When the call ends, the controlling zone controller 630 (zone I) sends a Zone to Zone Call End packet 820 to zone controller 632 (zone II). The controllers 630, 632 then send Call End Message(s) 820 to participating repeater sites and End of Radio Call messages 822 to participating console sites in their zones, as appropriate. Specifically, with reference to FIG. 8, Call End Message(s) 820 are sent from zone controller 630 to base site 606, and from zone controller 632 to base site 616. In response to receiving the Call End Message(s) 820, the participating repeater sites 606, 616 send Leave MCIP message(s) 824 to their associated routers 610, 622 to leave the multicast group in generally the same manner described in relation to single-zone calls (FIG. 3B). Similarly, console 652 leaves the multicast group by sending a Leave MCIP message 824 to its associated router 824.

The present disclosure therefore has identified various methods for implementing dispatch calls using IP multicasting protocols in single-zone and multiple-zone architectures. The methods provide for efficient use of communication resources, through dynamic assignment of IP multicast addresses on a call by call basis for transmission of payload messages.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
   receiving, by a controller from a communication source, a request for a talkgroup call;
   upon receipt of the request for the talkgroup call, identifying, by the controller, a payload multicast group address to be used by the communication source for distributing a payload message to a participating device of the talkgroup call;
   distributing, by the controller to the communication source and the participating device, the payload multicast group address;
   issuing, from the participating device to a first network device, a command to enable the participating device to receive a payload messages via the payload multicast group address;
   sending, from the communication source to a second network device, a payload message addressed to the payload multicast group address; and
   sending, by the second network device, the payload message to the participating device via the payload multicast address.

2. The method of claim 1, wherein the communication source is selected from a group consisting of a portable wireless communication device, a mobile wireless communication device, a wireline communication device, a wireless console, a wireline console, a repeater, a site controller, a comparator, a telephone interconnect devices and an internet protocol telephony device.

3. The method of claim 1, wherein the participating device is selected from a group consisting of a portable wireless communication device, a mobile wireless communication device, a wireline communication device, a wireless console, a wireline console, a repeater, a site controller, a comparator, a telephone interconnect device, an internet protocol telephony device, a call logger, a scanner, and a gateway.

4. The method of claim 1, wherein the payload message comprises any one of an audio payload, a data payload, a video payload, and a multimedia payload.

5. The method of claim 1 wherein the step of distributing comprises the controller sending to the communication source and the participating device a call grant message signifying a start of the talkgroup call, the call grant message comprising the payload multicast group address to be used by the communication source for the talkgroup call.

6. The method of claim 5, further comprising the steps of:
   receiving, by the controller from at least one of the communication source and the participating device, a request to affiliate to a talkgroup, and
   upon receipt of the request to affiliate to the talkgroup, identifying, by the controller, a control multicast group address to be used for distributing a control message to at least one of the communication source and the participating device,
   wherein the controller sends the call grant message to at least one of the communication source and the participating device via a repeater, the call grant message being one of a unicast message and a multicast message, the multicast message being sent via the control multicast group address.

7. The method of claim 5, further comprising the steps of:
   receiving, by the controller from at least one of the communication source and the participating device, a request to affiliate to a talkgroup, and
   upon receipt of the request to affiliate to the talkgroup, identifying, by the controller, a control multicast group address to be used for distributing a control message to at least one of communication source and the participating device,
   wherein the controller sends the call grant message to at least one of the communication source and the participating device via a dispatch console, the call grant message being one of a unicast message and a multicast message, the multicast message being sent via the control multicast group address.

8. The method of claim 1, wherein the step of issuing, from a participating device to a first network device, a command to enable the participating device to receive a payload message via the payload multicast group comprises sending an IGMP Join messages to the first network device.

9. The method of claim 1 further comprising the steps of:
   determining, by the controller, that the talkgroup call has ended;
   sending, from the controller to the participating device, a call end message signifying the end of the talkgroup call; and upon receipt of the call end message, issuing, by the participating device, a command to the first network device to discontinue the participating device from receiving payload messages via the payload multicast group address.

10. The method of claim 9, further comprising the steps of:
receiving, by the controller from at least one of the communication source and the participating device, a request to affiliate to a talkgroup, and
upon receipt of the request to affiliate to the talkgroup, identifying, by the controller, a control multicast group address to be used for distributing a control message to at least one of the communication source and the participating device,
wherein the controller sends the call end message to at least one of the communication source and the participating device via a repeater, the call end message being one of a unicast message and a multicast message, the multicast message being sent via the control multicast group address.

11. The method of claim 9, further comprising the steps of:
receiving, by the controller from at least one of the communication source and the participating device, a request to affiliate to a talkgroup, and
upon receipt of the request to affiliate to the talkgroup, identifying, by the controller, a control multicast group address to be used for distributing a control message to at least one of communication source and the participating device,
wherein the controller sends the call end message to at least one of the communication source and the participating device via a dispatch console, the call end message being one of a unicast message and a multicast message, the multicast message being sent via the control multicast group address.

12. The method of claim 9, further comprising the steps of:
receiving, by the controller from at least one of the communication source and the participating device, a request to affiliate to a talkgroup, and
upon receipt of the request to affiliate to the talkgroup, identifying, by the controller, a control multicast group address to be used for distributing a control message to at least one of communication source and the participating device,
wherein the controller sends the call end message to at least one of the communication source and the participating device via a base station, the call end message being one of a unicast message and a multicast message, the multicast message being sent via the control multicast group address.

13. The method of claim 9, wherein the step of issuing, by the participating device, a command to the first network device to discontinue the participating device from receiving payload messages via the payload multicast group address, comprises, sending an IGMP Leave messages to the first network device.

14. The method of claim 1 further comprising the step of receiving, by the participating device, the payload message via the payload multicast group address.

15. A method comprising the steps of:
sending, from a communication device to a controller, an affiliation request for a talkgroup;
upon receipt of the affiliation request, identifying, by the controller, a control multicast group address for use in sending control signaling to the talkgroup;
sending, by the controller to the communication device, an affiliation acknowledgment comprising the control multicast group address;
upon receipt of the affiliation acknowledgment, issuing, by the communication device to a network device, a command to enable the communication device to receive a control message via the control multicast group address; and
sending, from the network device to the communication device, the control message addressed to the control multicast group address.

16. The method of claim 15 further comprising the steps of:
sending, by the communication device to the controller, a deaffiliation request for the talkgroup;
upon receipt of the deaffiliation request, sending, by the controller to the communication device, a deaffiliation acknowledgment;
upon receipt of the deaffiliation acknowledgment, issuing, by the communication device to the network device, a command to discontinue sending control messages to the communication device via the control multicast group address.

17. The method of claim 15, wherein the communication device is selected from a group consisting of a portable wireless communication device, a mobile wireless communication device, a wireline communication device, a wireless console, a wireline console, a repeater, a site controller, a comparator, a telephone interconnect device, and an internet protocol telephony device.

18. In a communication system comprising at least one communication device participating in a talkgroup call, a method comprising the steps of:
sending, from a communication device to a controller, an affiliation request for a talkgroup;
upon receipt of the affiliation request, identifying, by the controller, at least one multicast group address to be used for distributing communication information to the communication device;
sending, from the controller to the communication device, an affiliation response comprising the at least one multicast group address;
upon receipt of the affiliation response, joining, by the communication device, the at least one multicast group address; and
receiving, by the communication device, communication information via the at least one multicast group address, wherein the at least one multicast group address comprises a payload multicast group address for distributing payload messages to the talkgroup.

19. The method of claim 18, wherein the multicast group address comprises a control multicast group address, and wherein the communication information received by the communication device comprises control messages addressed to the control multicast group address.

20. The method of claim 18, wherein the multicast group address comprises a payload multicast group address, and wherein the communication information received by the communication device comprises payload messages addressed to the payload multicast group address.

21. The method of claim 18, wherein the multicast group address comprises a control multicast group address and a payload multicast group address, the communication information received by the communication device comprises control messages addressed to the control multicast group address and payload messages addressed to the payload multicast group address.

22. The method of claim 21, wherein the control multicast group address differs from the payload multicast group address.

23. The method of claim 18, further comprising the step of sending, from a network device the communication device, at least one payload message addressed to the payload multicast group address.

24. The method of claim 18, further comprising the steps of:
sending, from the communication device to the controller, a deaffiliation request for the talkgroup;
upon receipt of the deaffiliation request, sending, from the controller to the communication device, a deaffiliation response; and
sending, from the communication device to a network device, a leave message instructing the network device to disassociate the communication device from the at least one multicast group address associated with the talkgroup.

25. The method of claim 24, wherein the step of sending a leave message causes the communication device to discontinue receiving payload messages addressed to the payload multicast group address.

26. The method of claim 24, wherein the step of sending a leave message causes the communication device to discontinue receiving control messages addressed to the control multicast group address.

27. A communication system comprising:
a controller;
a first network device and a second network device coupled to the controller;
a communication source coupled to the first network device; and
a participating device coupled to the second network device,
when the controller, the first network device, the second network device, the communication source, and the participating device are operable:
the controller receives a request for a talkgroup call from the communication source, upon receipt of the request for the talkgroup call, the controller identifies a payload multicast group address to be used by the communication source for distributing a payload message to the participating device of the talkgroup call, and the controller sends a talkgroup call grant message comprising the payload multicast group address to the communication source and the participating device;
the participating device issues a command to the second network device to enable the participating device to receive payload messages via the payload multicast group address,
the communication source sends a payload message addressed to the payload multicast group address to the first network device, and
the first network device sends the payload message to the participating device via the payload multicast group address.

28. The communication system of claim 27, wherein the communication source is selected from a group consisting of a portable wireless communication device, a mobile wireless communication device, a wireline communication device, a wireless console, a wireline console, a repeater, a site controller, a comparator, a telephone interconnect device, and an internet protocol telephony device.

29. The communication system of claim 27, wherein the participating device is selected from a group consisting of a portable wireless communication device, a mobile wireless communication device, a wireline communication device, a wireless console, a wireline console, a repeater, a site controller, a comparator, a telephone interconnect device, an internet protocol telephony device, a call logger, a scanner, and a gateway.

30. A communication system comprising:
a controller;
a network device coupled to the controller; and
a communication device coupled to the network device,
when the controller, the network device, and the communication device are operable:
the controller receives an affiliation request for a talkgroup from the communication device, and upon receipt of the affiliation request for the talkgroup, the controller identifies a control multicast group address for use in sending control signaling to the talkgroup, and sends an affiliation acknowledgement comprising the control multicast group address to the communication device,
upon receipt of the affiliation acknowledgement, the communication device issues a command to the network device to enable the communication device to receive a control message via the control multicast group address, and
in respond to the command, the network device sends the control message addressed to the control multicast group address to the communication device.

31. The communication system of claim 30, wherein the communication device is selected from a group consisting of a portable wireless communication device, a mobile wireless communication device, a wireline communication device, a wireless console, a wireline console, a repeater, a site controller, a comparator, a telephone interconnect device, and an internet protocol telephony device.

* * * * *

UNITED STATES PATENT AND TRADEMARK OFFICE
CERTIFICATE OF CORRECTION

PATENT NO.     : 6,647,020 B1
DATED          : November 11, 2003
INVENTOR(S)    : Maher et al.

It is certified that error appears in the above-identified patent and that said Letters Patent is hereby corrected as shown below:

<u>Column 13,</u>
Line 63, change "receive a payload messages via the payload multicast" to -- receive a payload message via the payload multicast --

Signed and Sealed this

Fifteenth Day of June, 2004

JON W. DUDAS
*Acting Director of the United States Patent and Trademark Office*